Nov. 10, 1953  T. F. ESERKALN ET AL  2,658,425
ADJUSTABLE RAM FOR MACHINE TOOLS
Original Filed Dec. 17, 1946                             2 Sheets-Sheet 1
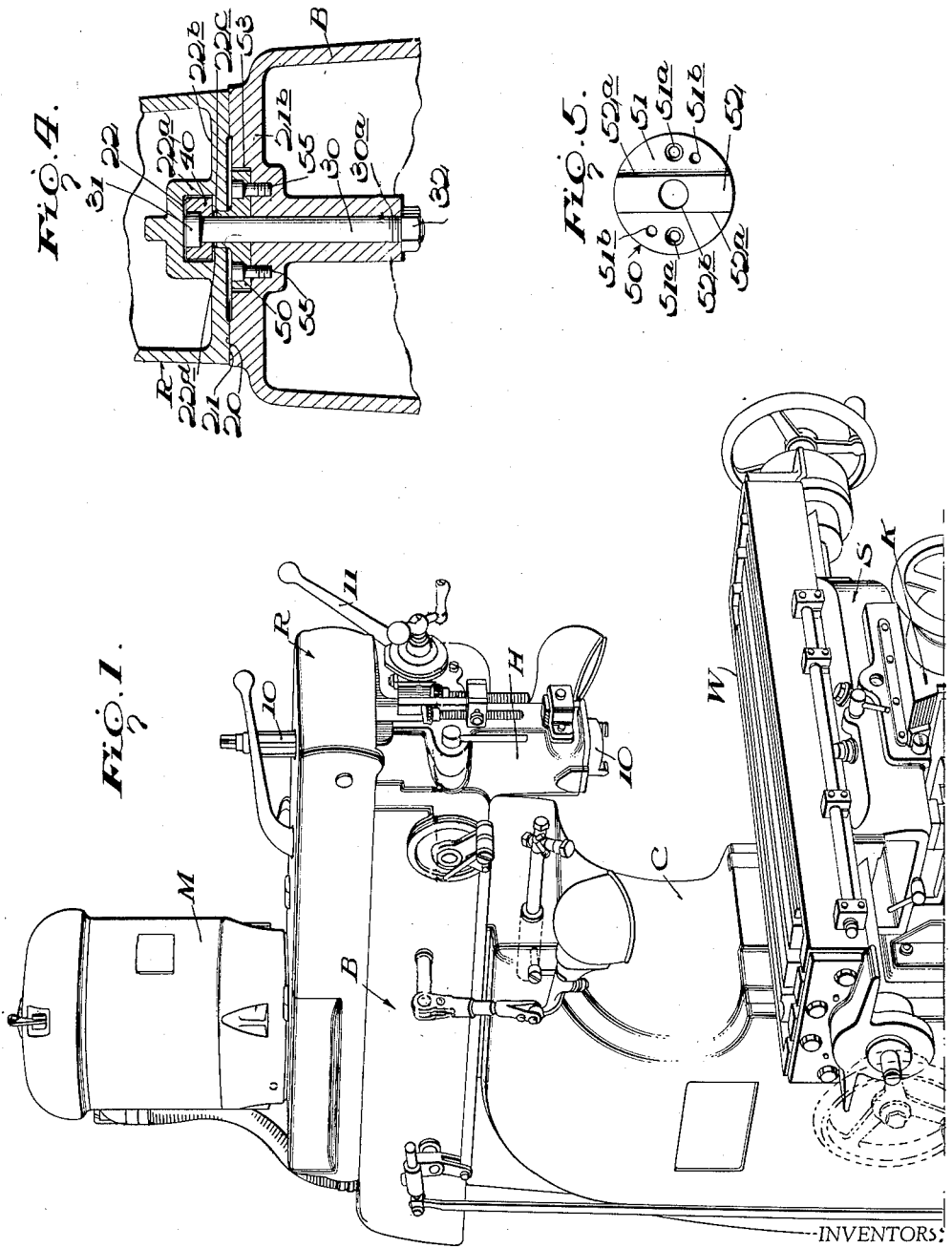
INVENTORS:
Theodore F. Eserkaln
Freddy Steinbrecker
BY Peck & Peck
ATTORNEYS Nov. 10, 1953 T. F. ESERKALN ET AL 2,658,425
ADJUSTABLE RAM FOR MACHINE TOOLS
Original Filed Dec. 17, 1946 2 Sheets-Sheet 2
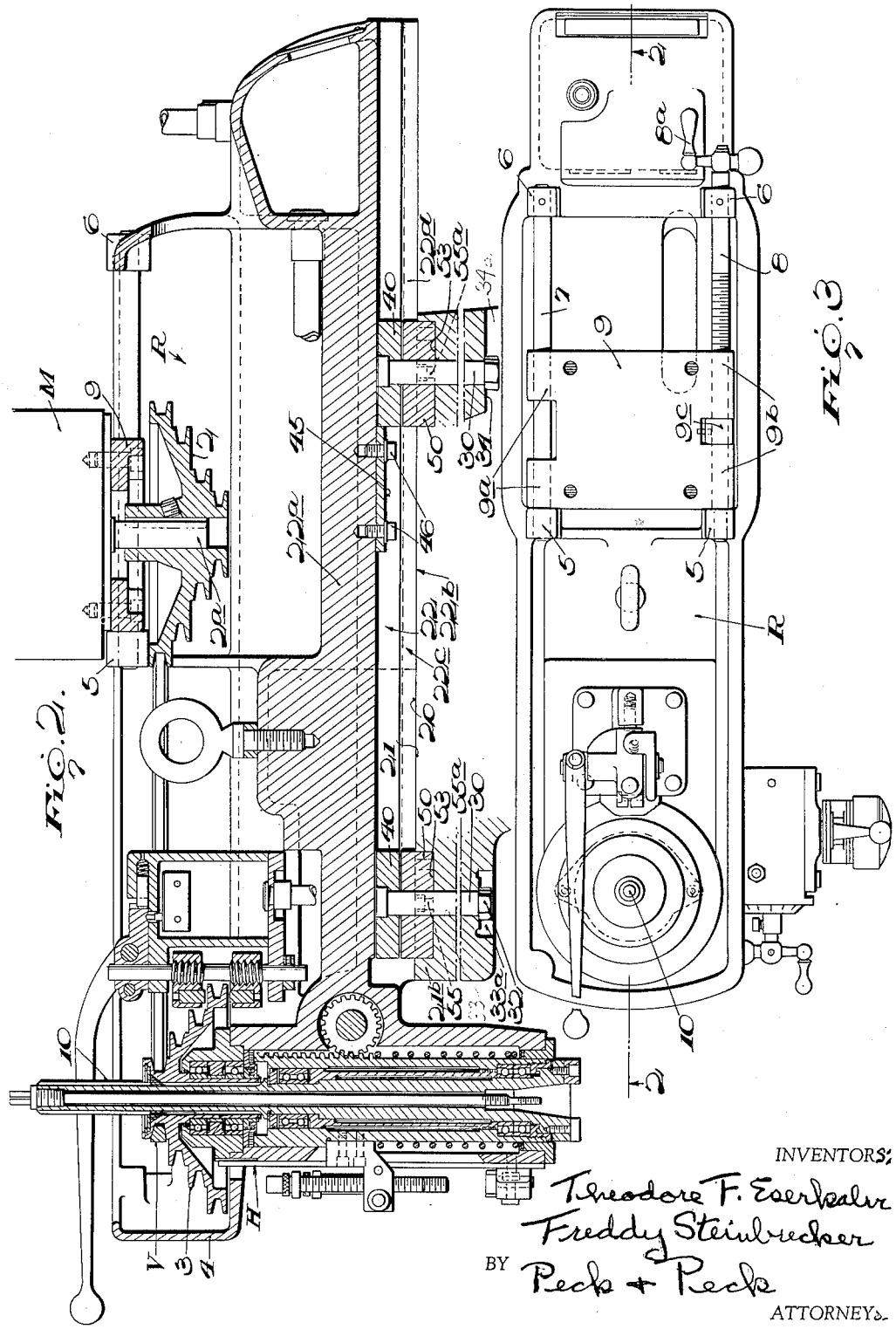
INVENTORS:
Theodore F. Eserkaln
Freddy Steinbrecker
BY Peck + Peck
ATTORNEYS.

Patented Nov. 10, 1953

2,658,425

UNITED STATES PATENT OFFICE 2,658,425

ADJUSTABLE RAM FOR MACHINE TOOLS

Theodore F. Eserkaln, Wauwatosa, and Freddy Steinbrecker, Racine, Wis., assignors to George Gorton Machine Co., Racine, Wis., a corporation of Wisconsin Original application December 17, 1946, Serial No. 716,842, now Patent No. 2,526,547, dated October 17, 1950. Divided and this application April 21, 1950, Serial No. 157,324

2 Claims. (Cl. 90—16)

This invention relates to certain improvements in adjustable rams for machine tools, and the nature and objects of the invention will be readily recognized by those skilled in the art in the light of the following explanation and detailed description of the accompanying drawings illustrating what we at present consider to be the preferred embodiments and mechanical expressions of our invention from among various other embodiments, adaptations, forms, arrangements and combinations of which the invention is capable within the broad spirit and scope thereof.

This application is filed as a division of our copending parent application filed December 17, 1946, Serial No. 716,842, for Improvements in Machine Tools, now Patent No. 2,526,547, granted October 17, 1950.

This invention is primarily concerned with machine tools of the so-called vertical milling, routing, die sinking, profiling and the like types, generally characterized by a vertically disposed column or frame structure at the forward side of which there is positioned a suitable work table organization which includes a horizontally and vertically adjustable work table, with a vertical cutter spindle positioned above such work table. In such types of machine, the cutter spindle is mounted for vertical movements axially toward and from the work table, in a cutter head located at the forward end of a ram structure mounted on the upper side of the vertical column for adjustments horizontally to position the cutter spindle relative to the work table located therebelow.

It is a general object of our invention to improve the over-all accuracy and efficiency of such cutter spindle mounting, adjustable ram types of machine tools.

It is a more specific object to provide an improved design of cutter spindle carrying ram structure and of an adjustable mounting and guide arrangement therefor by which the ram structure may be readily accurately adjusted with precision to an adjusted position and locked in such adjusted position against displacement.

With the foregoing and certain other objects in view which will be readily apparent from the following detailed description, our invention consists in certain novel features in design and construction of parts and in certain novel combinations and arrangements thereof, all as will be more specifically referred to and explained hereinafter.

Referring to the accompanying drawings in which similar reference characters refer to corresponding parts throughout the several figures thereof:

Fig. 1 is a perspective view of a vertical spindle milling machine embodying the ram and its adjustable mounting of our invention, certain lower portions of the machine below the work table not being shown.

Fig. 2 is a vertical longitudinal section taken as on the line 2—2 of Fig. 3, through the adjustable ram and its mounting of the embodiment of Fig. 1.

Fig. 3 is a view in top plan of the adjustable ram of Fig. 1.

Fig. 4 is a vertical transverse section through the upper portion of the ram supporting base of the machine column and lower portion of the ram unit mounted thereon, and showing particularly the mounting and arrangement of the ram locking T-bolts and associated clamping plates and key members.

Fig. 5 is a top plan view of one of the key members of the adjustable mounting arrangement for the ram. A vertical spindle type of milling machine is illustrated in Fig. 1, as embodying and including a form and construction of adjustable ram and its mounting of our invention, adapted to such machine. The illustrated machine includes a vertical supporting column or frame structure C supported upon any suitable base structure (not shown). A work table W is mounted and supported in horizontally disposed position for movements in a horizontal plane to laterally adjusted positions, and for vertical movements upwardly or downwardly to vertically adjusted positions, by a suitable adjustable work table supporting organization. Such organization includes a vertically adjustable knee K slidably engaged with the forward side of column C and a horizontally adjustable saddle S slidably supported on the upper side of the knee K for horizontal movements along a straight line path longitudinally of the knee, that is "in" or "out" relative to the machine. The work table W is slidably mounted on the saddle S for horizontal movements in opposite directions along a straight line path transversely of the saddle S and at right angles to the path of "in" and "out" movements of the saddle, that is, longitudinally across, or to the right and left relative to the machine. The work table W is bodily moved by and with the saddle S on the "in" and "out" movements of the saddle relative to the machine.

The type of vertical milling machine of Fig. 1, also includes a rotary cutter spindle 10 which is rotatably mounted in vertically disposed position above the work table W in a cutter head H carried by and depending from a horizontally adjustable ram structure or unit R. The ram unit R is slidably mounted and supported on a horizontally disposed base structure B, formed or provided at the upper end of the vertical column C, for horizontal movements in opposite directions along a straight line path parallel to the straight line path of "in" and "out" movements of the saddle S and table W. Thus, by adjusting the position of the ram R, the position of spindle 10 may be adjusted relative to the work table W therebelow.

The cutter spindle 10 is mounted in the cutter head H for vertical movements axially toward and from the work table W. Suitable actuating mechanism for effecting such vertical movements of the cutter spindle is provided, and includes, in this instance, a manual operating lever 11 located at the right hand side of the ram mounting base B at the upper end of the column C. The spindle 10, in this example, is driven by a motor M which is mounted on and carried as a unit with the ram R. A suitable power transmission or spindle drive is provided for placing the motor M in driving connection with spindle 10, such spindle drive being hereinafter described.

The ram structure or unit R of our invention in the example embodiment hereof, as adapted to the illustrated type of machine tool, is comprised of a generally rectangular, box-like structure, preferably as a single casting, and includes the vertically disposed cutter head H at the outer end or forward end thereof positioned above work table W. The upper surface of the base B is precision machined to form and provide a horizontal surface 20 for slidably receiving and supporting thereon the ram R which has its under surface 21 thereof correspondingly precision machined to provide a horizontal complementary surface for slidably engaging and seating upon the horizontal upper surface 20 of the base B, as will be clear by reference to Figs. 2 and 4 of the drawings.

We have by our present invention provided a design and construction of adjustable mounting and guiding means by which the ram R is slidably mounted on the base B for horizontal movements along a straight line path "in" or "out" to positions of accurate adjustment of the cutter head H and spindle 10 relative to the work table W therebelow. In the example embodiment, referring now to Figs. 2 and 4, the ram R is formed with a T-slot 22 machined or otherwise formed in the lower or under side wall thereof extending along the longitudinal center of the ram from end to end thereof. In this instance, a rib 22a is provided at the inner or upper side of and preferably integral with the lower or under wall 22b of ram R. The rib 22a thus provides a body of material of sufficient thickness and width to permit of machining or otherwise forming therein the T-slot 22 of the desired depth and width without structurally weakening or reducing the rigid and necessary non-deflectable character of the ram structure.

Suitable T-bolts 30 are provided mounted in positions in the base B of column C, for engaging in the T-slot 22 of the ram R, and for releasably securing the ram in any adjusted position thereof against displacement. In this example two (2) of such T-bolts 30 are provided with one thereof located in the forward end of base B which overhangs the work table W, and the other thereof being located at the rear end portion of base B. It is, however, to be here noted that our invention is not limited or restricted to any particular number of such T-bolts 30, as any suitable number necessary to meet the conditions of any particular embodiment or machine tool may be utilized.

Each T-bolt 30 includes a head 31 at the upper end thereof which is positioned eccentrically thereon relative to the vertical or longitudinal axis of the T-bolt. The lower end 30a of each T-bolt is externally threaded and a locking nut 32 is threaded thereon as shown in Fig. 4. The T-bolts 30 are suitably mounted and confined in vertically disposed positions extending upwardly through the base B with the nuts 32 at the lower ends of the bolts being located in positions accessible to a suitable tool for rotation of the nuts to clamp and lock the bolts in a ram adjusting position, or to release the bolts to permit of sliding adjustment of the ram R on the base B.

In this particular example, the forward T-bolt 30 extends upwardly through a vertical bore 33 in the overhanging, forward end of base B with the nut 32 of the bolt positioned in a recess 33a formed in the under wall of the base, and in clamping or locking position being engaged against such under wall. The rearwardly located bolt 30 is mounted in vertically disposed position in and extending through a bore 34 formed through structure of the base B adjacent the rear end of the base. The nut 32 of rear T-bolt 30 when in clamping or locking position is engaged against the under surface of base structure B around the lower end of the bore 34 through that structure. The rear wall of base B may, for example, be provided with a re-entrant portion which provides a recess or pocket 34a in which the nut 32 of rear T-bolt 30 is located for ready access by a tool for rotating the nut between clamping and releasing positions.

Each of the T-bolts 30 extends upwardly into the T-slot 22 of the ram R, through the reduced width slot or key-way forming throat 22c of the slot, with the eccentric head 31 of the bolt positioned in the full width portion of the slot, as will be clear by reference to Fig. 4 in particular. When positioned in slot 22, the upper surface of the head 31 of a bolt 30, and the inner surface of the top wall of the slot may, as in this example, have only operating clearance therebetween. The external diameter of the shank of each bolt 22 is less than the internal width of the throat or key way 22c of the slot, for a purpose to be referred to hereinafter.

A rectangular guide and clamping plate 40 is mounted on the head end of each T-bolt 30 within the full width portion of the T-slot of the ram, and this guide and clamping plate has a width and a depth or thickness to provide a close sliding or running fit in the T-slot.

Thus, with the nuts 32 of the T-bolts 30 loosened to release the guide and clamping plates 40 from tightly clamped engagement at their under sides against the adjacent surfaces provided by wall 22b at the lower side of the major width portion of T-slot 22, the ram R may be readily moved horizontally along a straight-line path on and in sliding engagement with the upper surfaces 20 of the base B. During such movement of ram R, the plates 40 generally constrain the ram to its straight line horizontal path of movement. In the particular example hereof, the eccentric head 31 of each T-bolt 30 is counter sunk and fitted into a suitable recess in the upper side of the plate 40 associated therewith. A T-bolt 30 is thus constrained and held against rotation about its vertical axis relative to the clamping plate 40.

Key members 50 are provided in association with the T-bolts 30 and the throat or key-way 22c of the T-slot 22, for constraining and guiding ram R precisely to and along its straight-line path of movement during adjustment, as well as to constrain the ram to its precise adjusted position against lateral displacement. Referring to Figs. 4 and 5 in particular, each key member 50 consists of a circular base 51 and a key portion 52 extended transversely and diametrically across and projecting upwardly from the upper side of the base. The key 52 of each key member has a width corresponding to the width of the keyway 22c formed by T-slot 22 through the lower wall 22b of ram structure R. The opposite vertical side surfaces 52a of the key 52 of each key member 50 are precision machined, as are the vertical surfaces 22d along and defining the opposite sides at the key-way 22c through the bottom wall 22b of the ram structure. Hence, the key 52 of a key member 50 may be fitted and received in the key-way 22c of T-slot 22 with a sliding fit but with very close tolerances having been provided between the engaged surfaces 22d of the ram and 52a of the key member.

The width of the key 52 of a key member 50 is greater than the external diameter of the shank or body of a T-bolt 30, with which such key member is to be associated, and a vertical T-bolt receiving bore 52b is formed extending axially through the circular base 51 and through the key 52 on such base. The base 51 is provided with diametrically opposite and counter bored fastening screw receiving bores 51a therethrough, and in addition is provided with diametrically opposite dowel pin receiving bores 51b, as clearly shown by Fig. 5.

A circular recess 53, which in this instance is of slightly greater internal diameter than the external diameter of base 51 of a key member 50, is formed in the upper side wall 21b of the ram supporting base structure B, around and surrounding each of the T-bolt receiving bores 33 and 34 in such wall. A key member 50 is secured in properly aligned position received and seated in each of the circular recesses 53, by machine screws 55 (see Fig. 4) extended through the bores 51a of the key member and threaded into suitable tapped bores in the wall 21b of the base structure B. Suitable dowel pins 55a may be properly positioned in each recess 53 secured in wall structure 21b for fitting into the dowel pin bores 51b of a key member to accurately position that member.

With the key members 50 in mounted positions in recesses 53, the key 52 of each key member projects upwardly into and has a sliding fit in the key way 22c of the T-slot 22. Due to the precise, minimum tolerance fit of the keys 52 in the keyway 22c, the ram R is maintained accurately horizontally aligned in position on the base B, for true straight line, horizontal sliding movements between positions of adjustment. In such mounted positions of the key members 50, the T-bolts 30 respectively associated therewith, extend upwardly through the bores 52b of the key members and into the full width portion of the T-slot 22 where the eccentric heads 31 of the T-bolts have non-rotative seating in the associated clamping plates 40, respectively.

Attention is here directed to a feature of the foregoing design and arrangement of the key members 50 by which no particular accuracy is required, in aligning the recesses 53 for the key members 50 in the upper wall 21b of base structure B. Recesses 53 may be machined or otherwise formed in wall 21b of a substantially larger internal diameter than the external diameter of the bases 51 of the key members, so that the key members may be moved radially or laterally within the confines of their respective recesses. In a preferred method of assembly, it is only necessary to align the key members 50 with a straight edge or the like instrument laid along the keys 52. The key members may then be moved laterally, if necessary, for the designed alignment on and relative to base B, so as to position and align the keys 52 with the true straight line path along which the ram R is to be moved between positions of adjustment on the base. After the necessary alignment and positioning of the key members they may be secured in such final position by the screws 55 and the dowel pins (not shown) as referred to hereinabove.

In order to adjust the position of the ram unit R along its straight line path "in" or "out" relative to the machine, to thereby position the cutter head H of the ram relative to the work table W herebelow, it is only necessary to loosen the T-bolt clamping nuts 32 and then slide the ram along its horizontal, true straight line path to the desired position of adjustment thereof. The nuts 32 may then be tightened to draw bolts 30 downwardly to securely fasten the guide plates 40 into position clamping the ram R in its adjusted position on the base B.

A stop or abutment plate 45, referring now to Fig. 2, for limiting the horizontal straight line movements of the ram in either direction on the base B is provided, and in this instance happens to be of rectangular plan form secured in fixed position by machine screws 46, against the surface provided by rib 22a at and across the upper side of the full width portion of T-slot 22. This stop plate 45 is located in position between the forwardly and rearwardly located clamping plates 40 and their respective T-bolts 30. Thus, the rear end edge of stop plate 45 is engaged by the forward side of rear guide plate 40 to form a stop limiting sliding movement of ram R to the rear, while the edge provided by the forward end of stop plate 45 is engaged by the rear edge of the forward clamping plate 40 to form a stop limiting movement of the ram forwardly from base B.

The ram R in the form of this example includes the motor M together with a drive or transmission from such motor to the cutter spindle 10 mounted in the cutter head H. Such transmission or drive may, for example, be of the belt type and include a fixed step driving pulley 2 of the cone type, and a fixed step driven pulley 3 of the cone type splined on to the cutter spindle 10, with a suitable driving belt V (see Fig. 2) connecting these pulleys. Obviously, if desired, any other suitable form of power transmission forming a component of the ram unit R, may be substituted for the pulley and belt type of transmission of this example.

The ram structure R includes the belt or pulley guard 4 at the forward end thereof around and laterally protecting and enclosing the driven pulley 3 on the cutter spindle 10. This ram structure with the pulley guard 4 is of the general type disclosed and claimed in the U. S. Patent No. 1,862,052, dated June 7, 1932, to George Gorton.

The ram unit R of this example includes, referring now to Figs. 2 and 4, the pairs of lugs 5 and 6, in this instance formed integral with the ram structure. Such pairs of lugs are spaced apart longitudinally of the ram with the lugs of each pair spaced transversely of the ram and being located at opposite sides thereof, respectively, so that, the lugs 5 and 6 at each side of the ram are longitudinally aligned. These lugs include horizontal bores therethrough with the bores of the lugs 5 and 6 at each side of the ram in axial alignment longitudinally of the ram. A rod 7 is mounted at its opposite ends in and extends between the lugs 5 and 6 located at one side of the ram. An externally threaded adjusting screw 8 is mounted between the lugs 5 and 6 at the opposite side of the ram and parallel with rod 7. The opposite ends of the adjusting screw 8 are rotatably journaled in the axially aligned bores of the lugs 5 and 6. A suitable hand crank 8a is provided on the rear end of adjusting screw 8 for rotating the screw in either direction. A motor mounting plate 9 is slidably mounted and confined at one side thereof on the guide rod 7 by means of the spaced bearing sleeves 9a which alidably receive rod 7. At its opposite side the mounting plate 9 is supported on the screw 8 by spaced sleeves 9b.

A nut 9c is interposed mid-way between the sleeves 9b and restrained thereby against axial movement. Nut 9c has an internally threaded bore therethrough to receive and engage the externally threaded screw 8 which is extended therethrough. The motor M is bolted or otherwise secured in position on mounting plate 9 (see Fig. 2) with the motor shaft 2a thereof vertically disposed and extending downwardly through and a distance below the plate into the interior of the ram structure R. The driving pulley 2 is mounted on shaft 2a below the mounting plate 9.

Hence, by rotating screw 8 by hand crank 8a, the motor mounting base 9 with motor M thereon is adjustable as a unit longitudinally in either direction on ram unit R toward or from pulley 3 on cutter spindle 10 in order to adjust the spacing between driving pulley 2 and driven pulley 3 to thereby adjust the tension of driving belt V, as will be readily understood.

It will also be evident that various other forms, designs embodiments, substitutions, eliminations, adaptations and combinations may be resorted to without departing from the broad spirit and scope of the invention as defined in the appended claims and hence we do not wish to limit ourselves in all respects to the exact and specific disclosures of the selected example of the invention herein illustrated and described.

What we claim is:

1. In combination, a column structure having a horizontal support surface on and extended longitudinally along the upper side thereof; a ram slidably mounted on said support surface for horizontal movements thereon in either direction along a straight line path; said ram including a lower wall providing a T-slot therein extended longitudinally therealong and opening therethrough to form a key-way defined by opposite side walls having their inner facing surfaces in precise parallelism; separate key members in said horizontal ram supporting surface spaced apart therealong at the upper side of said column structure; each of said key members including a key adapted to extend upwardly into the key-way in the lower wall of said ram; said keys each being formed with precisely parallel opposite side surfaces and having a width to extend into said key-way and slidably engage said surfaces with close tolerances with the opposite parallel surfaces, respectively, of said key-way defining walls; said key members being adapted to be independently adjusted into fixed relative positions at which the opposite side surfaces thereof are in precise alignment, and precisely parallel with the straight line path of movement of said ram; vertically disposed bolts mounted in said column structure and being extended upwardly through said key members, respectively, and said key-way; and a clamping plate mounted on the upper end end of each bolt within said T-slot for clamping engagement with the inner side of the lower wall of said ram.

2. In combination, a column structure; a ram mounted on said column structure for movements in either direction along a straight line path to selected positions of adjustment thereon; said ram including an inner wall adapted to be slidably engaged with said column structure and being formed to provide a key-way therethrough extended longitudinally thereof; separate and independent key members on said column structure spaced apart thereon along the straight line path of movement of said ram; each of said key members including a key adapted to extend and be slidably received in the key-way in the inner wall of said ram; said keys each being formed with precisely parallel opposite side surfaces and each having a width to be engaged in said key-way with close tolerances; said key members being adapted to be independently adjusted into fixed positions relative to each other at which the opposite side surfaces thereof are in precise alignment and are precisely parallel with the straight line path of movement of said ram; clamping plates on said ram adapted to be engaged with the outer side of said inner wall of the ram; and mechanism on said column structure for releasably engaging said clamping plates in positions clamping said ram to said column structure.

THEODORE F. ESERKALN.
FREDDY STEINBRECKER.

References Cited in the file of this patent

UNITED STATES PATENTS

| Number | Name | Date |
|---|---|---|
| 1,653,846 | Graves | Dec. 27, 1927 |
| 2,073,505 | Turney | Mar. 9, 1937 |
| 2,140,957 | Hanna | Dec. 20, 1938 |
| 2,146,446 | Schmidt et al. | Feb. 7, 1939 |
| 2,320,776 | Gorton | June 1, 1943 |
| 2,326,467 | Kuehn | Aug. 10, 1943 |